United States Patent [19]

Squirrell

[11] Patent Number: 5,109,883
[45] Date of Patent: May 5, 1992

[54] ISOLATOR WITH A HYDRAULIC ACTUATOR AND WITH A ROTATION-TRUEING COUPLING FOR THE ISOLATOR SHAFT

[75] Inventor: Anton F. Squirrell, Mellingen, Switzerland

[73] Assignee: Grovak Grossventiltechnik AG, Baar, Switzerland

[21] Appl. No.: 613,535

[22] PCT Filed: May 26, 1989

[86] PCT No.: PCT/GB89/00593
§ 371 Date: Jan. 14, 1991
§ 102(e) Date: Jan. 14, 1991

[87] PCT Pub. No.: WO89/11612
PCT Pub. Date: Nov. 30, 1989

[30] Foreign Application Priority Data

May 26, 1988 [GB] United Kingdom ............... 8812480

[51] Int. Cl.⁵ .................................. F16K 35/00
[52] U.S. Cl. .................................. 137/385; 251/58
[58] Field of Search ............ 251/58; 74/25; 137/385

[56] References Cited

U.S. PATENT DOCUMENTS

| | | | |
|---|---|---|---|
| 2,911,953 | 11/1959 | Killian | 251/58 |
| 2,954,754 | 10/1960 | Flick | 251/58 |
| 3,237,916 | 3/1966 | Bryant | 251/58 |
| 3,765,438 | 10/1973 | Di Sciascio | 251/58 |
| 4,039,419 | 8/1977 | Buse | 204/225 |

FOREIGN PATENT DOCUMENTS

| | | |
|---|---|---|
| 2150392 | 4/1972 | Fed. Rep. of Germany ........ 251/58 |
| 1129326 | 9/1956 | France . |
| 1401605 | 2/1974 | United Kingdom . |

Primary Examiner—A. Michael Chambers
Attorney, Agent, or Firm—Gottlieb, Rackman & Reisman

[57] ABSTRACT

An isolator which includes an isolator shaft, an isolator closure, e.g., a valve plate, carried by the isolator shaft, a hydraulic actuator for the isolator shaft, an auxiliary shaft equipped with at least one element for driving at least one extraneous device, e.g., a limit switch, and a coupling drivingly interconnecting the isolator shaft with the auxiliary shaft. The hydraulic actuator includes a casing which has an exterior mounting flange at one end for connection to the isolator and internally houses a hydraulic ram and a lever arm assembly, with the ram being articulated at one end to the lever arm assembly and at the other end to the end of the casing remote from the flange. The coupling is designed to convert any possibly uneven motion of the isolator shaft to a true rotary motion of the auxiliary shaft, with the latter being a tubular body rotatably mounted on a tube member fixed to the isolator, and with the isolator shaft being connected to the tubular body by a universal joint located interiorly of the tube member.

2 Claims, 3 Drawing Sheets

ISOLATOR WITH A HYDRAULIC ACTUATOR AND WITH A ROTATION-TRUEING COUPLING FOR THE ISOLATOR SHAFT

This invention relates to a isolators, in particular diverter valves or flap isolators (herein both referred to as isolators) used for isolating gases under severe operating conditions of high temperature and/or high pressure.

For many diverter valve or flap isolator applications it is necessary or desirable to use hydraulic actuation systems.

Conventional hydraulic actuation systems usually consist of a hydraulic ram operating a lever which is connected to a shaft to be rotated, to which a valve closure plate is attached. The base end of the ram is pin jointed to an anchor bracket which is normally fixed to some point on the damper or isolator frame. The disadvantage of this arrangement is that differences in temperature between the isolator frame (hot) and the hydraulic ram (cold) cause the effective length of the ram link system and hence the position of the blade to change.

The present invention provides a hydraulic actuator for an isolator, comprising a hydraulic ram one end of which is connected to a lever which is in turn connected to a shaft for a valve plate or other closure, the actuator having a casing which flange mounts on the isolator, and the other end of the said ram being attached to the end of the casing remote from the said flange.

The isolator which is the subject of the present invention more particularly has an actuator housed in a casing which flange mounts onto the valve or isolator to be driven. The actuator comprises a conventional hydraulic ram the base end of which is preferably pin jointed to an anchor bracket mounted interiorly of the casing at the end thereof remote from the flange. The rod end of the ram is preferably pin jointed to a lever arm which, when the casing is mounted on the isolator, will be drivingly connected to the isolator shaft.

The advantages of this arrangement are:
Temperature differential effects are eliminated.
There are no main bearings in the actuator which could inhibit the self aligning properties of the isolator shaft bearings.
No reaction loadings are taken on the frame of the isolator. The reaction torque is taken on the bearing mounting stools.
The provision of locking pins is facilitated.
Orientation of the actuator is universal and is not dependent on the necessity to locate the anchor point on the isolator frame.
The anchor point does not interfere with any external insulation.

Further features which may advantageously be used together with the hydraulic actuator according to the invention are as follows.

1) Auxiliary drive for devices such as limit switches

Since the blades of large isolators are subject to large loadings and to thermal expansion, the rotation of the input shafts of large isolators is never truly rotary, and they are subject to axial movements as well. With this type of shaft rotation it is virtually impossible to obtain accurate operation of shaft driven devices such as limit switches, deceleration valves and position transmitters.

The construction of the isolator according to the invention facilitates the fitting of a coupling to convert the uneven motion of the main isolator shaft to true rotary motion of an auxiliary shaft. This may be achieved by means of a device which consists of a short length of tube fixed onto the actuator casing and onto the outside diameter of which plain journal bearings are fitted. A tubular shaft which carries the operating cams for various auxiliary devices rotates on these bearings. This shaft is closed at its outboard end, and is driven by a universal joint from the main isolator shaft.

2) Locking pins for locking the isolator blade

Locking pins may be suitably provided to lock the isolator blade in normally three positions, closed, open or intermediate for maintenance. At the closed position it is important that the locking pin locates the isolator shaft and blade exactly in its completely closed position for safety of personnel who may be in the isolated space. It is not possible to achieve this by using a simple pin in a simple hole because the necessary clearances in the holes would allow unacceptable movement of the blade. This is overcome by using a circular pin with an eccentric sleeve.

Such features (1) and (2) may alternatively form independent and separate aspect of the invention.

The invention will be further described, by way of example only, with reference to the accompanying drawings, wherein:

FIG. 3b is an end view of the coupling shown in FIG. 3a, the view being taken from the right-hand side of FIG. 3a;

FIG. 4b is a partly sectional and partly elevational view taken in the direction of the arrow 4B in FIG. 4a.

Figure 1:
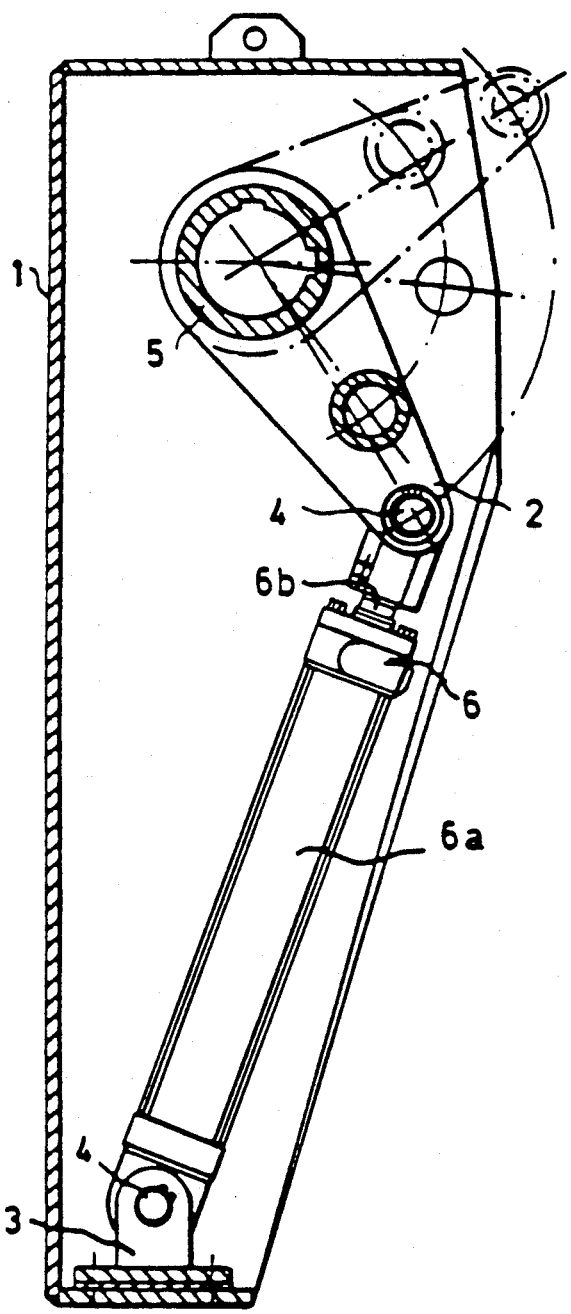
FIG. 1 is a sectional view of a hydraulic actuator for an isolator, according to the invention, the view being taken along the line 1—1 in FIG. 2.
Figure 2:
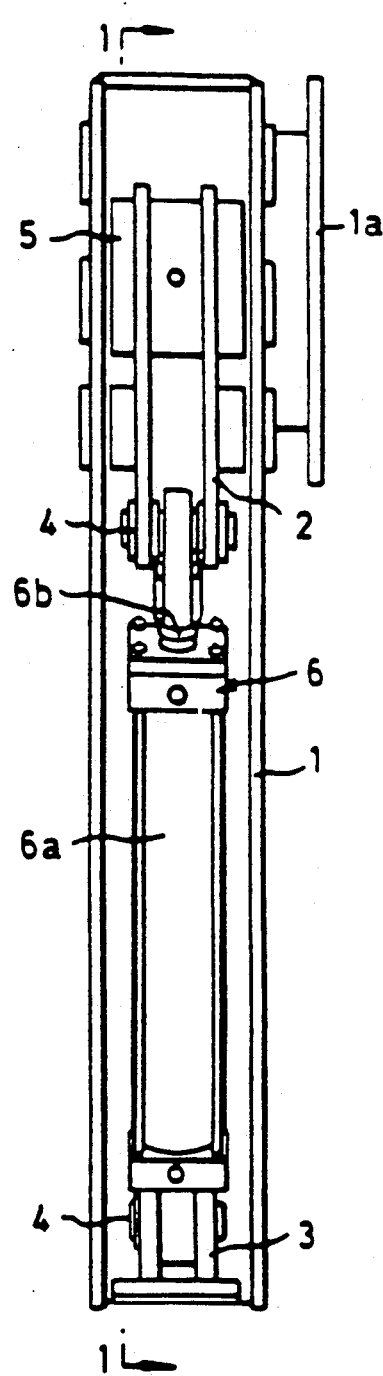
FIG. 2 is an orthogonal view of the actuator shown in FIG. 1, the view being taken from the right-hand side of FIG. 1.

FIGS. 1 and 2 of the drawings show an actuator including a casing 1, an exterior flange 1a of which located at one end region of the casing is to be mounted to the isolator to be driven. A lever arm assembly 2 is connected to one end (the rod end) of a conventional hydraulic ram 6 having a cylinder 6a and a rod 6b, the other end (the base end) of the ram being connected to an anchor bracket 3 mounted onto the end of the casing interiorly thereof at the end remote from the flange 1a. The ram 6 is pivotably connected to the anchor bracket 3 by a pin joint 4. The rod en-d of the ram 6 is connected to the lever arm assembly 2 by another pin joint 4. The other end of the lever arm assembly 2 is keyed to a collar 5 to which is in turn keyed an isolator shaft (not shown), which will carry a flap valve plate (not shown) or other valve closure as appropriate.

In operation the ram 6 is hydraulically actuated to pivot the lever arms 2 between the positions shown in solid and broken lines in FIG 1, to open and close the isolator by means of the valve closure carried by the isolator shaft, in a conventional manner.

However, because the actuator is contained within the casing 1, temperature differential effects between the hot isolator frame and the cold hydraulic ram can be overcome. The other advantages described in detail above can also be obtained.

Figure 3A:
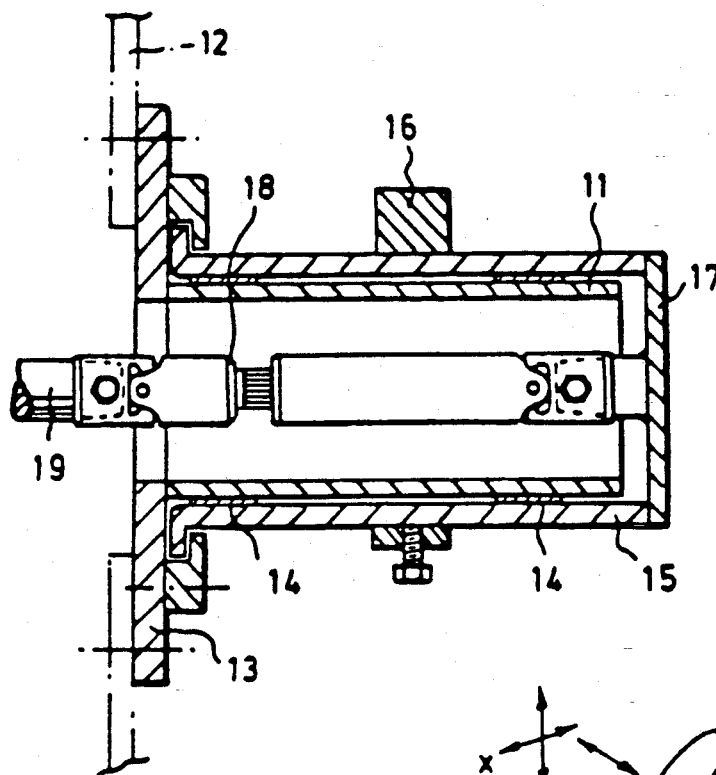
FIG. 3a is a sectional view, taken along the line 3A—3A in FIG. 3b, of a coupling for converting uneven motion of a main isolator shaft to rotary motion of an auxiliary shaft.
Figure 3C:
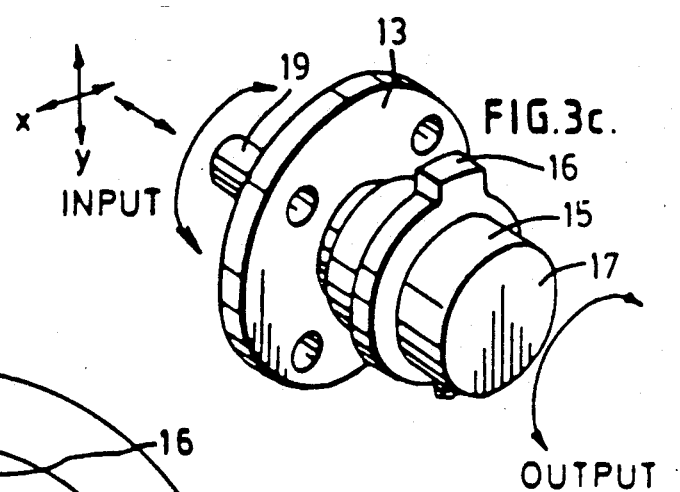
FIG. 3c is a perspective view illustrating operation of the coupling shown in FIGS. 3a and 3b.
Figure 3B:
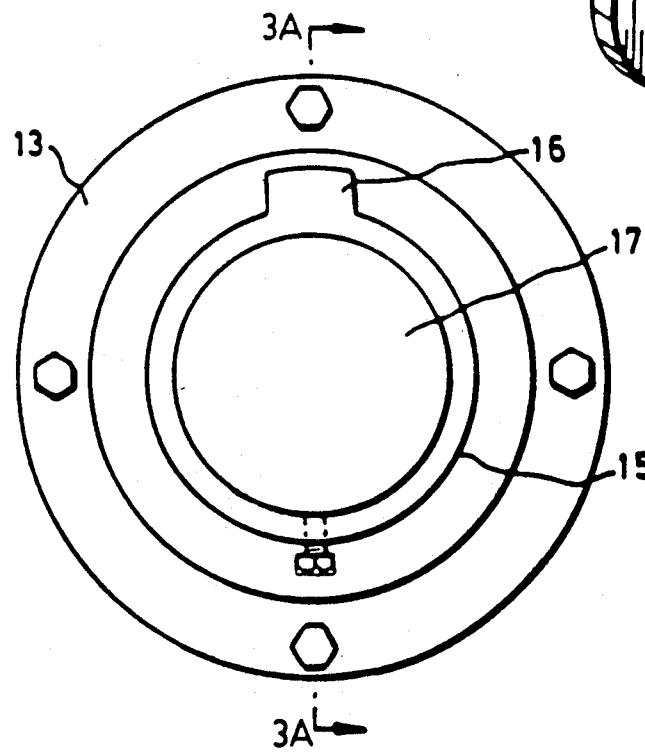

FIG. 3a, 3b and 3c show a means whereby a coupling is used to convert uneven motion of a main isolator shaft to true rotary motion of an auxiliary shaft. This is achieved by a device which comprises a short length of tube 11 fixed onto the actuator casing or body 12 by means of a mounting flange 13. Onto the outside diameter of the tube 11 are fitted plain journal bearings 14. A tubular output shaft 15 which carries operation cams 16 for various auxiliary shaft driven devices such as limit switches, deceleration valves and position transmitters (not shown) rotates on these bearings 14. The shaft 15 is closed at its outboard end 17, and is driven by a universal/flexible joint 18 from the main isolator (input) shaft 19.

Figure 4A:
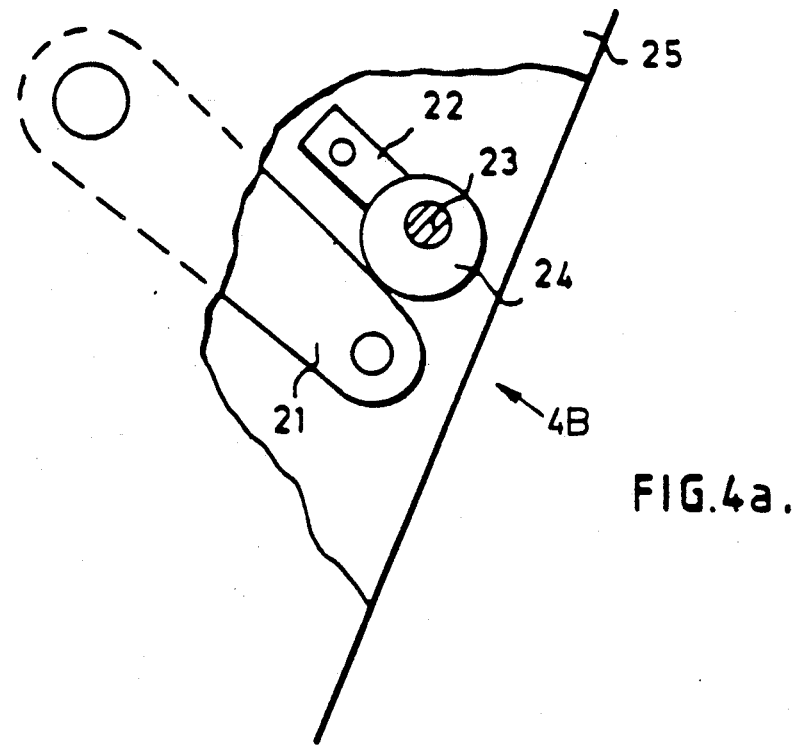
FIG. 4a is a side view of a locking pin construction for locking the isolator blade.
Figure 4B:
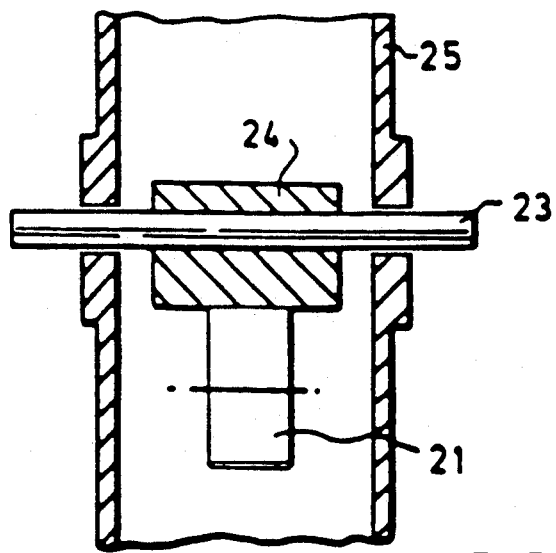

In the locking pin construction illustrated in FIG. 4a and 4b, there is shown an operating arm 21 in its closed position, a locking tab 22, a locking pin 23 of circular cross-section, and an eccentric locking sleeve 24. Numeral 25 indicates the actuator body. The locking tab 22 secures the eccentric locking sleeve 24 in a locked position by means of a bolt through the body of the actuator 25.

I claim:

1. An isolator, comprising: an isolator shaft; an isolator closure member carried by said isolator shaft; a hydraulic actuator for said isolator shaft; an auxiliary shaft for driving at least one extraneous device in response to operation of said isolator shaft; and a coupling interconnecting said isolator shaft and said auxiliary shaft for converting any possibly uneven motion of the former to a true rotary motion of the latter;

(a) said hydraulic actuator comprising a casing having first and second end regions and accommodating a part of said isolator shaft intermediate said end regions, said casing at said first end region thereof having an exterior mounting flange connecting the casing to the isolator and at said second end region thereof remote from said mounting flange having an interior mounting bracket, a lever arm assembly located within said casing and drivingly connected to said isolator shaft, and a hydraulic ram located within said casing and having a base end and a rod end, said base end of said ram being pin jointed to said mounting bracket and said rod end of said ram being pin jointed to said lever arm assembly, whereby said hydraulic actuator is protected from the effects of temperature differences existing between the normally hot isolator and the normally cold hydraulic actuator;

(b) said auxiliary shaft comprising a rotatable tubular body equipped on its exterior with at least one operating element for driving said at least one extraneous device; and (c) said coupling comprising a tube member fixed onto the isolator, a plurality of bearings fitted onto the exterior of said tube member, said tube member extending axially into said tubular body of said auxiliary shaft and rotatably supporting the same by means of said bearings, and a universal joint located interiorly of said tube member and drivingly interconnecting said isolator shaft with said auxiliary shaft.

2. An isolator as claimed in claim 1, further comprising means for locking said isolator closure member in any selected one of three operational positions, said locking means comprising a locking pin of circular cross-section supported by said casing, and an eccentric sleeve rotatably supported by said locking pin in a position to selectively clear, obstruct fully or obstruct partially any displacement of said lever arm assembly by said hydraulic ram.

* * * * *